(12) United States Patent
Kimata (10) Patent No.: US 7,740,105 B2
(45) Date of Patent: Jun. 22, 2010

(54) OUTER TUBE OF EXHAUST SYSTEM PART

(75) Inventor: Atsushi Kimata, Toyoake (JP)

(73) Assignee: Sango Co., Ltd., Aichi (JP)

( * ) Notice: Subject to any disclaimer, the term of this patent is extended or adjusted under 35 U.S.C. 154(b) by 443 days.

(21) Appl. No.: 11/659,980

(22) PCT Filed: Sep. 21, 2005

(86) PCT No.: PCT/JP2005/017384

§ 371 (c)(1),
(2), (4) Date: Feb. 12, 2007

(87) PCT Pub. No.: WO2006/046375

PCT Pub. Date: May 4, 2006

(65) Prior Publication Data

US 2007/0215408 A1    Sep. 20, 2007

(30) Foreign Application Priority Data

Oct. 28, 2004 (JP) ............... 2004-343078

(51) Int. Cl.
*F01N 13/08* (2010.01)
(52) U.S. Cl. .................. 181/227; 181/212
(58) Field of Classification Search ............ 181/212, 181/227, 228, 282; 29/890.08
See application file for complete search history.

(56) References Cited

U.S. PATENT DOCUMENTS

| | | | | |
|---|---|---|---|---|
| 3,087,580 A * | 4/1963 | Powers et al. | ............... | 181/282 |
| 4,333,545 A * | 6/1982 | Roberts | ............... | 181/282 |
| 4,851,298 A * | 7/1989 | Fukuda | ............... | 428/586 |
| 5,173,577 A * | 12/1992 | Clegg et al. | ............... | 181/282 |
| 5,422,445 A * | 6/1995 | Baird et al. | ............... | 181/282 |
| 6,575,267 B1 * | 6/2003 | Stiles et al. | ............... | 181/282 |
| 6,892,855 B2 * | 5/2005 | Warmenhoven | ............ | 181/282 |
| 7,293,628 B2 * | 11/2007 | Takahashi | ............... | 181/227 |
| 7,364,013 B2 * | 4/2008 | Nitta et al. | ............... | 181/282 |
| 2005/0252713 A1 * | 11/2005 | Takahashi | ............... | 181/227 |
| 2006/0042871 A1 * | 3/2006 | Yasuda et al. | ............... | 181/227 |
| 2007/0051558 A1 * | 3/2007 | Okawara et al. | ........... | 181/282 |
| 2007/0215408 A1 * | 9/2007 | Kimata | ............... | 181/212 |

FOREIGN PATENT DOCUMENTS

| JP | U-57-142124 | 2/1981 |
|---|---|---|
| JP | A-59-162318 | 9/1984 |

(Continued)

*Primary Examiner*—Jeffrey Donels
*Assistant Examiner*—Forrest M Phillips
(74) *Attorney, Agent, or Firm*—Oliff & Berridge, PLC (57) ABSTRACT

A sheet metal is rolled double to form a cylinder having an inner plate 2 and an outer plate 3, and form an overlapped portion 4, with their circumferential end portions 2a and 3a crossed in the circumferential direction. Between the inner plate 2 and the outer plate 3, a plurality of line grooves 5 are formed to extend outward of an outer tube 1, with their tip end portions facing with each other to be apart from each other by a predetermined distance from a peripheral edge of one of the inner plate and outer plate, and these line grooves 5 are arranged in parallel with each other along a longitudinal direction of the outer plate 3. And, at least one portion of the overlapped portion positioned between the neighboring line grooves is joined by welding W.

7 Claims, 6 Drawing Sheets

FOREIGN PATENT DOCUMENTS

| | | |
|---|---|---|
| JP | U-01-173412 | 12/1989 |
| JP | 03047421 A * | 2/1991 |
| JP | A-03-267519 | 11/1991 |
| JP | A-06-269884 | 9/1994 |
| JP | A-10-306721 | 11/1998 |
| JP | A-2001-082125 | 3/2001 |
| JP | A-2004-285969 | 10/2004 |

* cited by examiner

OUTER TUBE OF EXHAUST SYSTEM PART

FIELD OF THE INVENTION

The present invention relates to an outer tube of an exhaust system part, and relates to the outer tube of a muffler or an exhaust purifying device, for example.

BACKGROUND ART

In an exhaust system of a vehicle or the like with an internal combustion engine mounted thereon, there are disposed exhaust system parts such as a muffler aimed to reduce exhaust noise, an exhaust purifying device aimed to purify exhaust gas, and the like. In these exhaust system parts, generally employed is an outer tube formed in more than two layers to restrain radiation sound. For example, in Patent document 1 as cited below, there is disclosed a muffler, wherein a sheet material is wrapped around end plates and partition plates to provide an outer tube, and wherein the sheet material and peripheral flanges of the end plates and partition plates are welded by laser at the outside of the outer tube.

Also, in Patent document 2 as cited below, in a muffler for an internal combustion engine with a cylindrical portion of a shell formed in a double cylinder structure of an inner tube and an outer tube, there is proposed the muffler, wherein a vent passage is formed between an outer peripheral surface of the inner tube and an outer peripheral surface of the outer tube, to extend upward along a periphery of the shell from a lower part thereof, and wherein a through hole is formed at a higher position than a predetermined position of the inner tube, to communicate an upper end section of the vent passage with the through hole. As for its background, it is described that if the cylindrical portion of the shell is formed in the double cylinder structure, water may stay in its lowest section between the outer tube and the inner tube, and if the staying water is heated to provide steam, the lower section of the outer tube might be bulged downward by pressure of the steam. Therefore, it is proposed to prevent its deformation by introducing the steam into the muffler through the vent passage and through hole. In this respect, the outer tube as described in the above Patent document 1 corresponds to the shell as described in the above Patent document 2, while it is different from the outer tube constituting a part of the shell. Furthermore, in Patent document 3, there is disclosed a method for manufacturing a muffler, wherein a steel sheet is rolled around an outer periphery of an inner pipe, and processed by a lock-seaming process.

Patent document 1:

Japanese Patent Laid-open Publication No. 59-162318

Patent document 2:

Japanese Patent Laid-open Publication No. 2004-285969

Patent document 3:

Japanese Patent Laid-open Publication No. 6-269884

DISCLOSURE OF THE INVENTION

Problems to be Solved by the Invention

As described in the above Patent documents, as for the outer tube of the muffler, such an outer tube is getting major that a sheet metal is rolled double to form a cylinder having an inner plate and an outer plate, and form an overlapped portion with circumferential end portions of the inner plate and outer plate crossed in the circumferential direction, and the overlapped portion is joined by laser or the like. According to the outer tube with the double rolled structure, the inner plate and outer plate will not be in uniformly tight contact with each other, along the whole peripheries thereof, even if its shape has a circular cross section of a constant radius of curvature. It will be unavoidable that a tightly contacting portion and a portion with a clearance will be formed next to each other along its circumferential direction, depending upon bending conditions or bending manner of the plate, and even a spring back or the like caused after having been bent. As for an outer tube having a non-circular cross section, the radii of curvature of bent portions will vary, so that its tendency will be significant. That is, at a portion of a relatively small radius of curvature, they will be in tight contact with each other, without causing a clearance, whereas a portion of a relatively large radius of curvature tends to cause the clearance.

According to the muffler having the outer tube with the double rolled structure as described above, if joint portions or fitted portions at the circumferential end portions between the inner plate and outer plate, and opposite end plates of the outer tube, are sealed air-tightly by a laser welding, for example, water content between the inner plate and outer plate will become steam to expand the space between them, without being emitted outside or inside of the muffler. As a result, if the inner pressure of the above space is increased rapidly due to expansion by the steam, the inner plate will be bulged inside, and the outer plate will be bulged outside, to be deformed, respectively. This can be caused not only in the case where the circumferential end portions of the inner plate and outer plate are welded continuously, but also the case where they are welded by a spot welding. According to the joint by means of the spot welding, the steam staying in the space facing the spot welded portions will expand the clearance between the welded portions to provide a communication passage, through which it can be emitted outside, whereas portions other than the communication passage have been sealed in both of the longitudinal direction and circumferential direction. Therefore, the double rolled structure as described above is not enough to avoid the bulged deformation.

Also, the above deformation is caused by the outer tubes of not only the continuously rolled structure, but also multiple plates rolling structure (laminating a plurality of plates to be formed in a cylindrical shape). For example, even in the case where the beginning edge and ending edge of the outer tube with the multiple plates rolling structure are caulked by the lock-seaming process, as described in Patent document 3, and at the same time the opposite ends of the outer tube are tightly secured by curling to be joined with high air-tight property, there may be the case that the bulged deformation as described above can not be avoided. Thus, in such a state that the air-tight fitting between the opposite end plates and the outer tube is getting to be indispensable, means for venting the rapidly expanded steam in the circumferential direction is required. However, since emitting the expanded steam and preventing the water from being introduced are opposed matters, although the steam can be emitted through the vent passage and through hole, as described in the above-cited Patent document 2, the condensed water is allowed to enter into the vent passage, with the muffler being communicated with it, so that the effect for sealing the outer tube in the radial direction thereof will be deteriorated, and consequently the condensed water will be caused to be accumulated.

Therefore, according to the present invention, in an outer tube of an exhaust system part, with a sheet metal being rolled double to form a cylinder having an inner plate and an outer plate, and form an overlapped portion with circumferential end portions of the inner plate and outer plate crossed in the circumferential direction, and being joined at the overlapped portion, a problem to be solved is to provide the outer tube capable of appropriately emitting gases such as steam generated between the inner plate and the outer plate, without deteriorating the effect for sealing the outer tube in the radial direction thereof.

Means for Solving the Problems

To solve the above-described problem, according to the present invention, in an outer tube of an exhaust system part, with a sheet metal being rolled double to form a cylinder having an inner plate and an outer plate, and form an overlapped portion with circumferential end portions of said inner plate and outer plate crossed in the circumferential direction, and being joined at the overlapped portion, it is characterized in that a plurality of circumferential communication passages are formed between said inner plate and said outer plate, with tip end portions of the respective circumferential communication passages facing with each other to be apart from each other by a predetermined distance from a peripheral edge of one of said inner plate and said outer plate, and are arranged in parallel with each other along a longitudinal direction of said outer plate, and that at least one portion of said overlapped portion positioned between neighboring circumferential communication passages out of said plurality of circumferential communication passages is joined.

In the case where radial cross sections of said inner plate and outer plate are formed in a non-circular shape, respectively, said circumferential communication passages may be formed at positions of said inner plate and outer plate having a minimal radius of curvature thereof, respectively. And, said circumferential communication passages can be constituted by a plurality of line grooves formed by bulging said outer plate out. Further, as for the means for joining said overlapped portion, the one portion of said overlapped portion positioned between the neighboring circumferential communication passages out of said plurality of circumferential communication passages may be welded. For example, a spot welding by laser is appropriate.

Or, according to the present invention, in an outer tube of an exhaust system part, with a sheet metal being rolled double to form a cylinder having an inner plate and an outer plate, and with circumferential end portions of said inner plate and outer plate being joined by a lock-seaming process, it can be constituted by comprising a plurality of circumferential communication passages formed between said inner plate and said outer plate, with tip end portions of the respective circumferential communication passages facing with each other to be apart from each other by a predetermined distance from a peripheral edge of one of said inner plate and said outer plate, and being arranged in parallel with each other along a longitudinal direction of said outer plate. In the case where radial cross sections of said inner plate and outer plate are formed in a non-circular shape, respectively, said circumferential communication passages may be formed at positions of said inner plate and outer plate having a minimal radius of curvature thereof, respectively. And, said circumferential communication passages can be constituted by a plurality of line grooves formed by bulging said outer plate out.

Effects of the Invention

As the present invention is constituted as described above, the following effects can be achieved. That is, according to the outer tube with at least one portion of the overlapped portion being joined, when liquid such as water content contained in exhaust gas is vaporized to become gas such as steam of high pressure, the gas can pass through the plurality of circumferential communication passages, so that the gas will be emitted from the overlapped portion positioned between the neighboring circumferential communication passages, except for said one portion. Therefore, the outer tube can be prevented from being bulged out to be deformed, without the pressure between the inner plate and outer plate being excessively increased. On the contrary, since the overlapped portion is tightly contacted, with small pressure being caused when the exhaust gas passes through the inside of the outer tube, the exhaust gas can be prevented from being leaked outside of the outer tube.

In the case where the radial cross sections of said inner plate and outer plate are formed in the non-circular shape, respectively, with the circumferential communication passages being formed at positions having the minimal radius of curvature, the outer tube can be prevented from being bulged out to be deformed, more appropriately. And, if said circumferential communication passages are constituted by a plurality of line grooves formed by bulging the outer plate out, the inside of the outer tube can be formed to be smooth, components of the muffler or exhaust purifying device can be easily installed in the outer tube. As the means for joining the overlapped portion, if the welding is used, e.g., the spot welding by laser is employed, it can be joined easily and rapidly.

Also, according to the aforementioned outer tube with circumferential end portions of the inner plate and outer plate being joined by the lock-seaming process, when the liquid such as water content contained in exhaust gas is vaporized to become the gas such as steam of high pressure, the gas can pass through the plurality of circumferential communication passages, so that the gas will be emitted from the lock-seamed portion. Therefore, the outer tube can be prevented from being bulged out to be deformed, without the pressure between the inner plate and outer plate being excessively increased. On the contrary, since the lock-seamed portion is secured, with small pressure being caused when the exhaust gas passes through the inside of the tube, the exhaust gas can be prevented from being leaked outside of the outer tube.

DESCRIPTION OF CHARACTERS 1,11,21,31,41,51: outer tube
2,12,22,32: inner plate
3,13,23,33,43,53: outer plate
4,14,24,34,44,54: overlapped portion
5,15,25,35,45,55: line groove

BEST MODE FOR CARRYING OUT THE INVENTION

Figure 1:
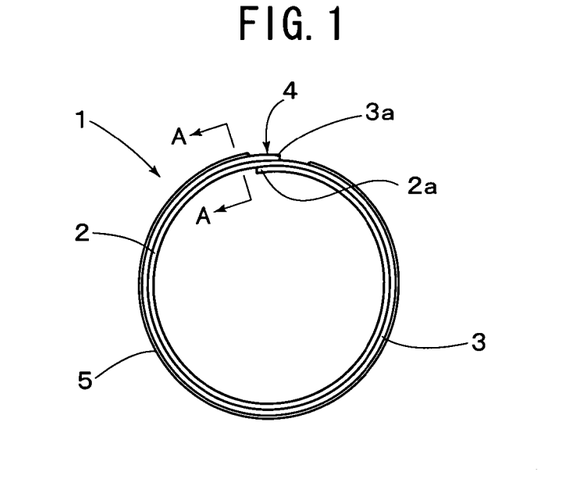
FIG. 1 is a front view showing an outer tube according to an embodiment of the present invention.
Figure 2:
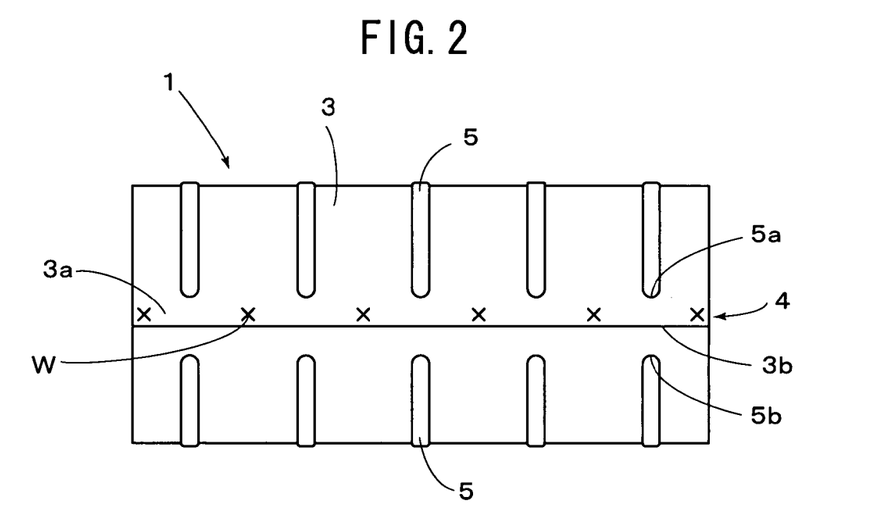
FIG. 2 is a plan view showing an outer tube according to an embodiment of the present invention.
Figure 3:
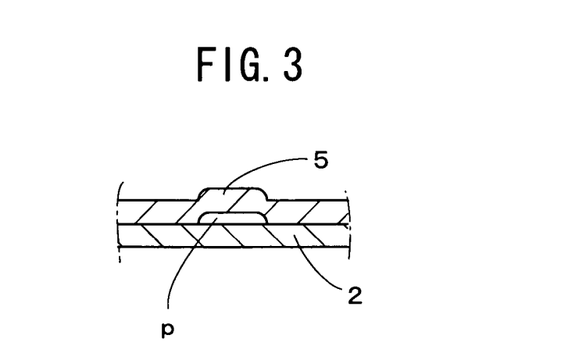
FIG. 3 is an enlarged cross sectional view as viewed from A-A in FIG. 1.

Hereinafter, will be explained a desirable embodiment of the present invention, referring to drawings. FIGS. 1-3 show an outer tube 1 of an exhaust system part according to an embodiment of the present invention. FIG. 3 shows an enlarged cross section as viewed from A-A in FIG. 1. As shown in FIGS. 1 and 2, the outer tube 1 is the one formed by rolling a sheet metal double to form a cylinder having an inner plate 2 and an outer plate 3, and crossing a circumferential end portion 2a of the inner plate 2 and a circumferential end portion 2a of the outer plate 3 in the circumferential direction to form an overlapped portion 4, and joining the overlapped portion 4, to be formed in two layers. The overlapped portion 4 is joined by welding (as indicated by W in FIG. 2) at positions appropriately spaced with each other in a longitudinal direction (generatrix direction). In this case, the portion may be joined discontinuously by any welding process such as the spot welding or laser welding, as the joining process. And, may be employed not only a through welding but also a fillet welding (to a corner portion) by means of MIG welding or the like.

As shown in FIG. 2, as for a plurality of circumferential communication passages formed between the inner plate 2 and outer plate 3, with tip end portions 5a and 5b of the respective circumferential communication passages facing with each other to be apart from each other by a predetermined distance from a peripheral edge 3b of the outer plate 3, and being arranged in parallel with each other along a longitudinal direction of the outer plate 3, a plurality of line grooves (ribs) 5 are formed to extend outward of the outer tube 1. According to the present embodiment, by press-forming the outer plate 3 in advance, for example, a plurality of line grooves 5 are formed to cross the longitudinal direction (generatrix direction) of the outer tube 1 (with 90 degree against the peripheral edge 3b of the outer plate 3), and extend in the circumferential direction. These line grooves 5 may be formed at the same time as the rolling is made by means of a roller rolling process or the like, in the rolling process, or other known processes may be employed to form the same. And, one portion of the overlapped portion 4 positioned between neighboring line grooves 5 is joined by the welding W. As a result, in each line groove 5, a communication passage (p) extending in the circumferential direction of the outer tube 1 is provided, as shown in FIG. 3. The height of each line groove 5 may be enough to pass the gas (e.g., steam) through it, so that it may formed to provide the height equal to or a half of the thickness of the plate material constituting the outer plate 3. In FIG. 2, although the distances extending from the tip end portions 5a and 5b to the peripheral edge 3b, respectively, are equal, they may be different from each other. Furthermore, although the tip end portions 5a and 5b are positioned in such a relationship as being faced with each other, in FIG. 2, they may be positioned in such a relationship as being directed to each other, as far as they will not cross the neighboring line grooves 5.

Since the outer tube 1 in the present embodiment is constituted as described above, when the liquid (e.g., water content) introduced into a space between the inner plate 2 and outer plate 3 is heated to be vaporized, so that the space between the inner plate 2 and outer plate 3 has become to be of a high pressure, the gas passes through each line groove 5 to be emitted from the circumferential end portions 2a and 3a. Therefore, the deformation of the outer tube 1 can be restrained. On the other hand, since both of the circumferential end portions 2a and 3a are formed to be smooth and in tight contact with each other, the sealing effect will not be deteriorated by the pressure at the same level as that of the exhaust gas in the outer tube 1. Therefore, the exhaust gas can be appropriately prevented from being leaked outside of the outer tube 1. According to the present embodiment, the line grooves 5 are formed only on the outer plate 3, and the inside of the outer tube 1 (inner surface of the inner plate 2) has been formed to be smooth, so that components of the muffler or exhaust purifying device can be easily installed in the outer tube 1.

Figure 4:
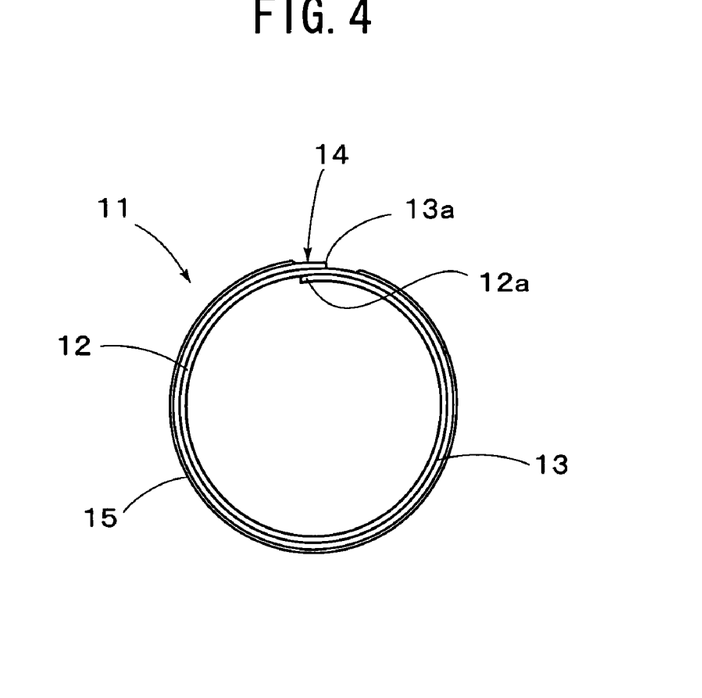
FIG. 4 is a front view showing a variation of an outer tube according to an embodiment of the present invention.
Figure 5:
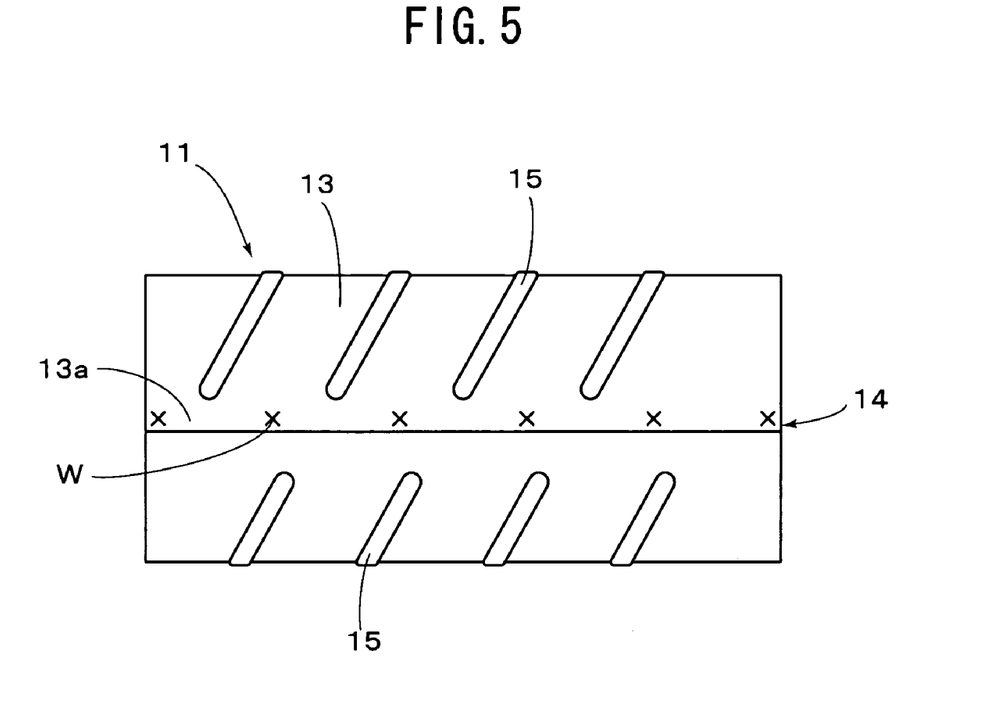
FIG. 5 is a plan view showing a variation of an outer tube according to an embodiment of the present invention.
Figure 6:
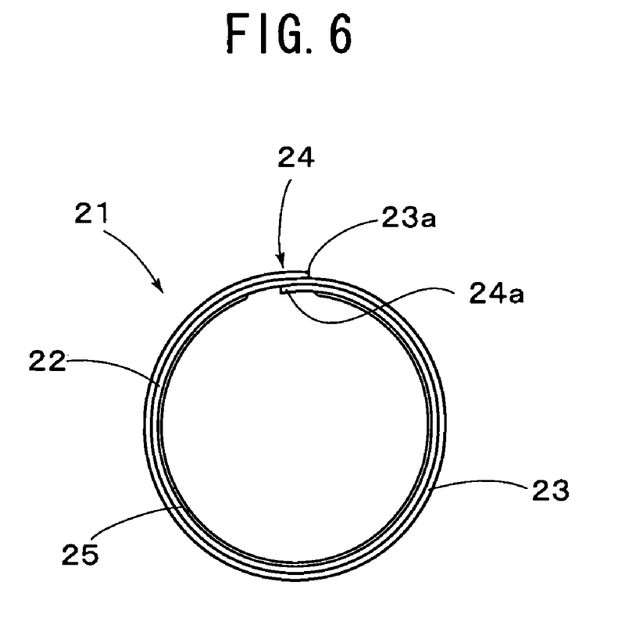
FIG. 6 is a front view showing a variation of an outer tube according to an embodiment of the present invention.
Figure 7:
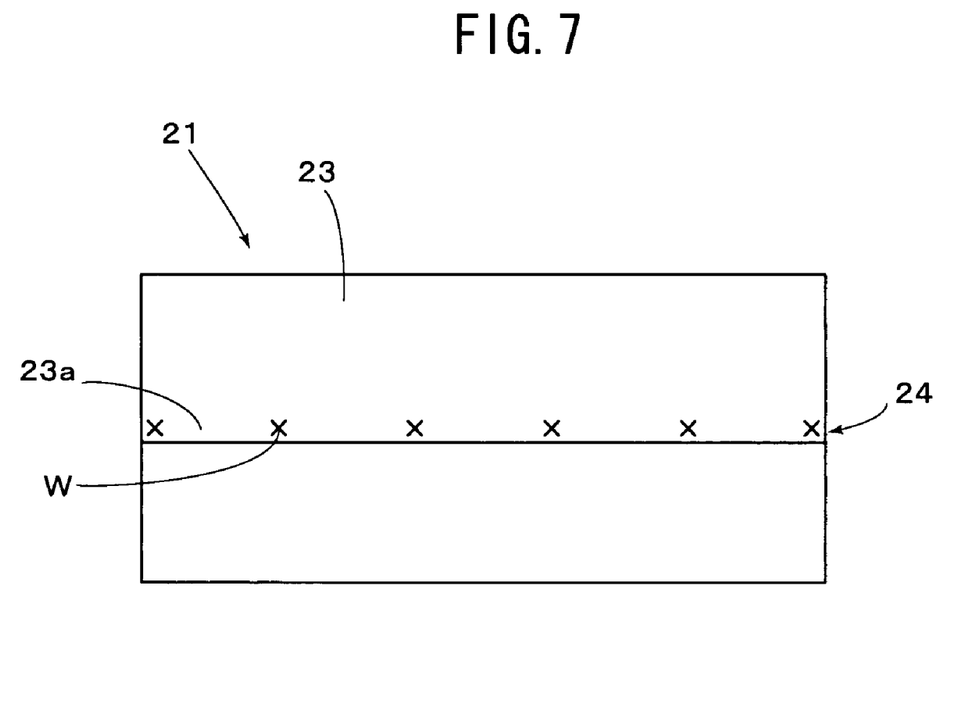
FIG. 7 is a plan view showing a variation of an outer tube according to an embodiment of the present invention.

Although each line groove 5 is formed in the circumferential direction to cross the longitudinal direction (generatrix direction) of the outer tube 1 with 90 degree against it, according to the embodiment as shown in FIGS. 1-3, each line groove 15 may be formed to cross the longitudinal direction (generatrix direction) of an outer tube 11 to be inclined (with 60 degree) against it, as shown in FIGS. 4 and 5. Or, as shown in FIGS. 6 and 7, each line groove 25 may be formed to extend inward, on an inner plate 22 of an outer tube 21. Since elements having reference numerals indicated in the figures following FIG. 4, with the same last numerals as those indicated for elements indicated in FIGS. 1-3, are substantially the same as the elements indicated in FIGS. 1-3, respectively, their characterized portions will be mainly explained, and explanation of other elements will be omitted, hereinafter.

Figure 8:
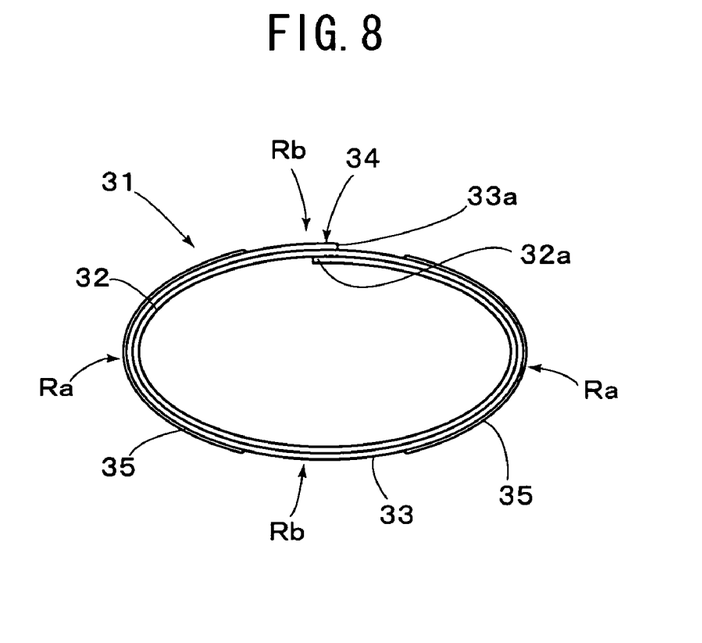
FIG. 8 is a front view showing an outer tube according to another embodiment of the present invention.
Figure 9:
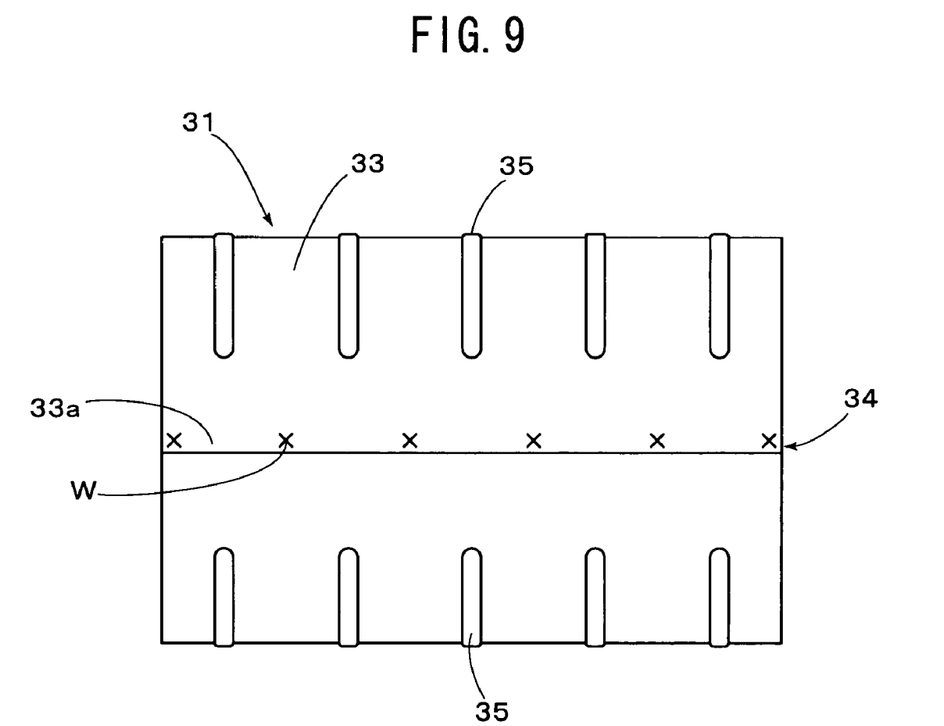
FIG. 9 is a plan view showing an outer tube according to another embodiment of the present invention.

FIGS. 8 and 9 show an outer tube 31 according to another embodiment of the present invention, wherein a metallic inner plate 32 and an outer plate 33 are rolled double to form a cylinder having an elliptic cross section as a non-circular shape. In the outer tube 31, a circumferential end portion 32a of the inner plate 32 and a circumferential end portion 33a of the outer plate 33 are formed to be smooth, so as to be in tight contact with each other, and an overlapped portion 34 is formed. According to the present embodiment, the overlapped portion 34 may be joined discontinuously by the welding W at positions appropriately spaced with each other in a longitudinal direction (generatrix direction), by any welding process such as the spot welding or laser welding.

As for a plurality of circumferential communication passages formed between the inner plate 32 and outer plate 33, a plurality of line grooves 35 are formed to extend outward of the outer tube 31. According to the present embodiment, by press-forming the plate material in advance, for example, a plurality of line grooves 35 are formed to cross the longitudinal direction (generatrix direction) of the outer tube 31, and extend in the circumferential direction. According to the present embodiment, the line grooves 35 are formed at a position Ra where the radius of curvature of the outer tube 31 is the smallest, respectively, while they are not formed at a position Rb of a large radius of curvature, respectively.

Thus, according to the present embodiment, since the cross section of the outer tube 31 is formed in the elliptic shape, the vertical dimension required for installing it in the vehicle can be made shorter than that provided in the case where it is formed in the circular shape, so that the space in the vehicle compartment can be broad, or the minimum road clearance can be made large. In the present embodiment, as the inner plate 32 and outer plate 33 are strongly pressed to each other at the position Ra where the radius of curvature is the smallest, it will be difficult for the gas (e.g., steam) to pass through them. In order to solve this, the line grooves 35 are formed at the position Ra where the radius of curvature of the outer tube 31 is the smallest, respectively, according to the present embodiment, so that the deformation of the outer tube 31 can be restrained, and the leak of exhaust gas can be prevented. Although the cross section of the outer tube 31 was formed to be elliptic, i.e., non-circular in shape, according to the present embodiment, it may be formed in the shape of racetrack, quadrangle or the like.

Although the line groove 35 is formed only at the position Ra of the smallest radius of curvature according to the present embodiment, the line groove 35 may be formed at the position Rb of large radius of curvature, too. And, each line groove 35 may be formed to be inclined against the longitudinal direction (generatrix direction) of the outer tube 31, in the same manner as shown in FIG. 5. Or, each line groove 35 may be formed to extend inward on the inner plate 32 of the outer tube 31, in the same manner as shown in FIG. 6.

Figure 10:
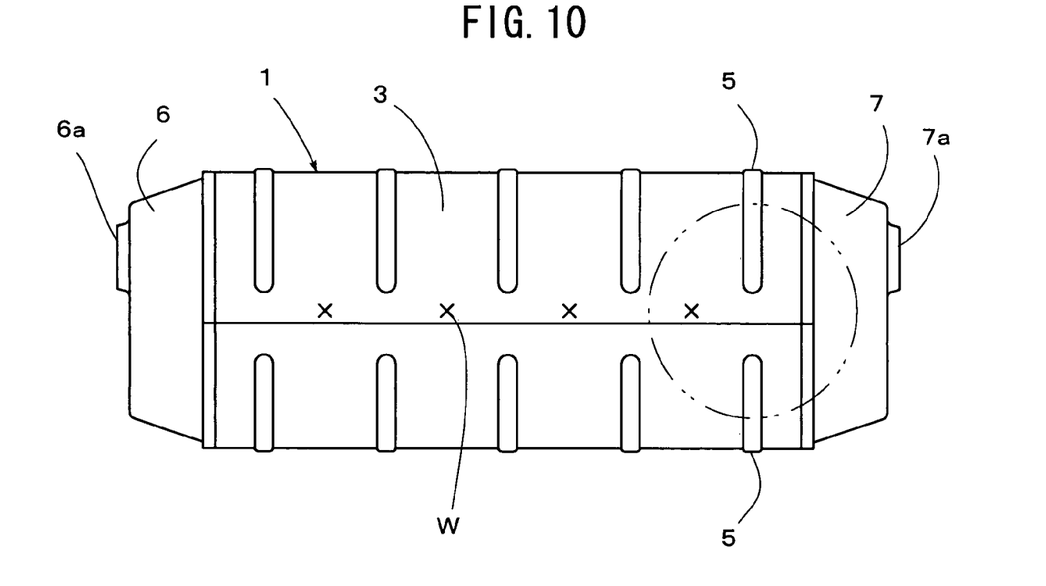
FIG. 10 is a plan view showing an embodiment of a muffler assembly applied with an outer tube according to an embodiment of the present invention.

FIG. 10 shows an embodiment, wherein the outer tube 1 as shown in FIGS. 1-3 is applied to a muffler assembly, and wherein contents (not shown) such as separators or inner pipes are inserted into the outer tube 1, end plates 6 and 7 are fitted into their opposite ends, and the end plates 6 and 7 and the outer tube 1 are welded along their whole periphery, to be secured. For example, in such a state that the cylindrical portions of the end plates 6 and 7 are fitted into the opposite end portions of the outer tube 1, respectively, the laser welding is applied onto the outer tube 1. Further, on the left end plate 6, an inlet opening 6a is defined to insert and secure an upstream exhaust pipe (not shown), and on a right end plate 7 (not shown), an outlet opening 7a is defined to insert and secure a downstream exhaust pipe.

Figure 11:
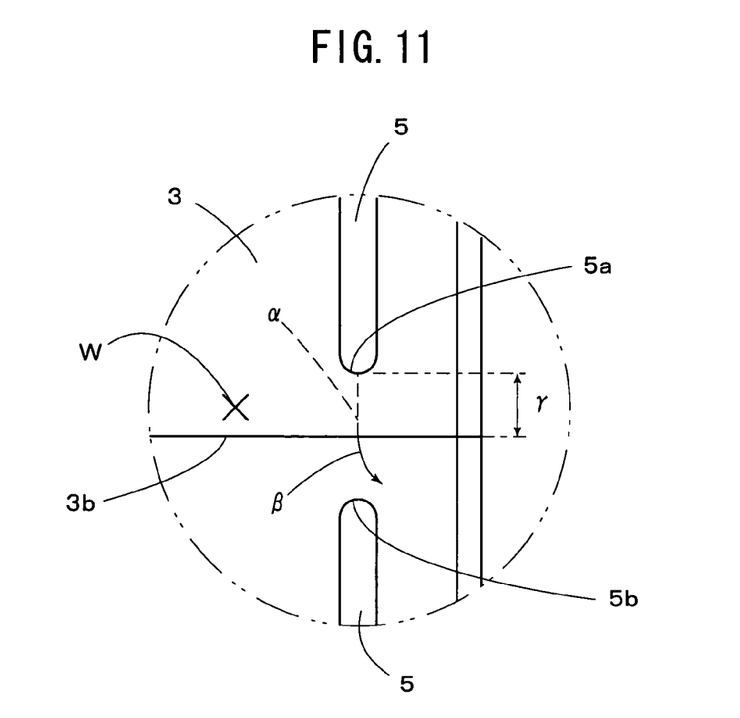
FIG. 11 is an enlarged view of a part as indicated by a two-dot chain line in FIG. 10.

As shown in FIG. 11 with the portion of two-dot chain line in FIG. 10 being enlarged, each line groove 5 is formed so that the tip end portions 5a and 5b of each line groove 5 face the peripheral edges of the circumferential end portions 3a, with a distance γ being apart between them, respectively. If the steam is rapidly expanded between the inner plate 2 and outer plate 3 to be fed into each line groove 5, to increase the pressure in each line groove 5, the steam will be emitted at once, as indicated by an arrow β for example, through a communication passage α, which is the shortest route to the low-pressure outer space. That is, since the inner plate 2 and outer plate 3 are in tight contact with each other, normally, the communication passage α does not exist. However, as a clearance is forcedly formed by the high pressure steam, it will become a communication passage α temporarily. After the steam was emitted, the inner plate 2 and outer plate 3 are in tight contact with each other again by means of its own elasticity, to cancel the communication passage α, so that the air-tight sealing against the outer space can be maintained. Consequently, the water can be prevented from being introduced from the outer space, and the exhaust gas can be prevented from being leaked from its inside.

With respect to a length of the communication passage α, i.e., distance between the tip end portions 5a and 5b of the line groove 5 and the peripheral edge of the circumferential end portion 3a, i.e., the peripheral edge 3b, it is desirable to set the length that will satisfy both of the tight contact (air-tight) property as required normally, and the communication as required at the time of high pressure, and that will not give a bar to the spot welding (or, lock-seaming process as described later) applied to the circumferential end portion 3a. And, it is desirable from the view point of easy manufacturing to set the width and height of each line groove 5 formed on the outer tube 1 to be minimal, respectively, in the values that will satisfy the capacity (cross section) for releasing the high pressure steam. The plurality of line grooves 5 may be formed on the inner plate 2 to be bulged inside thereof, with each tip end portion being formed close to face a peripheral edge (peripheral edge) of the circumferential end portion 2a (in FIG. 1). In this case, the steam will be emitted from the peripheral edge of the circumferential end portion 2a into the inside of the muffler (not shown). However, when the exhaust gas pressure is high, the emission will not be accelerated. Therefore, it is desirable to emit the gas from the peripheral edge 3b of the outer plate 3 to the outside of the muffler.

It is desirable for the plurality of the line grooves 5 to be provided at least one groove for each chamber (not shown, each chamber divided by separators) in the muffler. This is because it shall be done with in each chamber, since the steam flow will be prevented from being guided in the longitudinal direction (axial direction), with the outer tube 1 and separators (not shown) welded to be secured. Although the circumferential length of each line groove 5 may be set to be of any value, it is desirable to set the same as long as possible, so as to be capable of receiving a broad range of steam. In the case where the circumferential end portion 3a is intermittently secured by the spot welding or the like, it is desirable to provide the line groove 5 to be remote from the secured position as far as possible, i.e., to be positioned in the middle of the neighboring spot welded portions.

Figure 12:
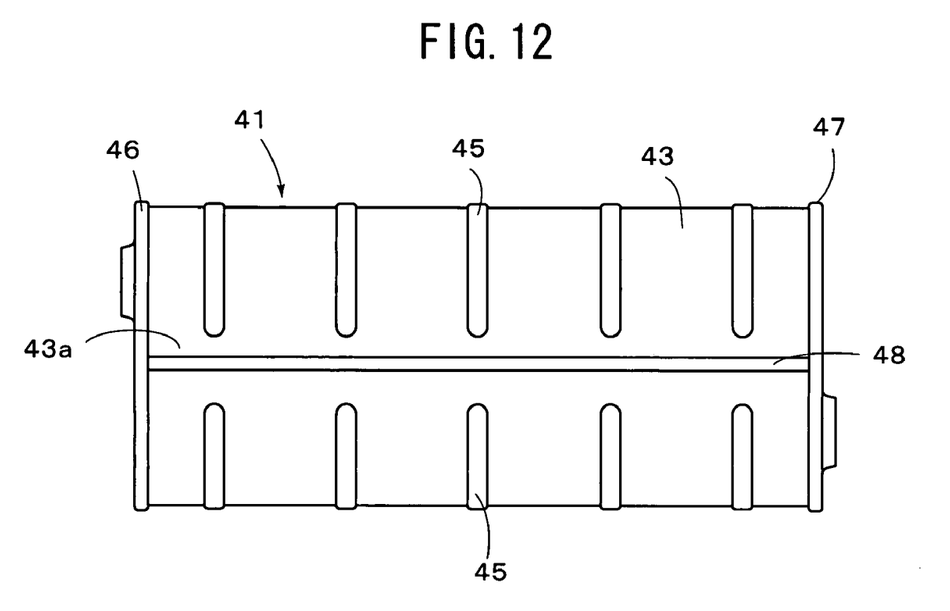
FIG. 12 is a plan view showing an embodiment of a muffler assembly applied with an outer tube according to another embodiment of the present invention.

FIG. 12 shows another embodiment of the present invention, wherein circumferential end portions of an inner plate (not shown in FIG. 12) and an outer plate 43 are caulked together (48) along the longitudinal direction (axial direction) by the lock-seaming process, and end plates 46 and 47 are joined to their opposite ends by a curling process. Then, each circumferential communication passage, in a plurality of circumferential communication passages formed between the inner plate and the outer plate 43, is provided with tip end portions facing each other with a predetermined distance being apart from the peripheral edge (caulking joint portion 48) of the outer plate 43, and formed with a plurality of line grooves 45 to extend outside of the outer tube 41, as the plurality of circumferential communication passages formed in parallel with each other along the longitudinal direction of the outer plate 43. These line grooves 45 are formed, in such a manner that each tip end portion is close to the caulking joint portion 48.

Consequently, the steam introduced into each line groove 45 provides by itself a communication passage from its tip end portion to the caulking joint portion 48, to be emitted outside through the caulking joint portion 48. The caulking joint portion 48 joined by the lock-seaming process according to the present embodiment is a rolling overlapped structure with two plates joined together. Therefore, normally, the water can be prevented from being introduced from the outer space, and the exhaust gas can be prevented from being leaked from its inside, whereas the high pressure steam can be emitted. In the case where the cross sections of the inner plate (not shown in FIG. 12) and the outer plate 43 are formed in the non-circular shape in the same manner as shown in FIGS. 8 and 9, each line groove 45 may be formed at a position where the radii of curvature of the inner plate and outer plate 43 are the smallest, respectively.

Figure 13:
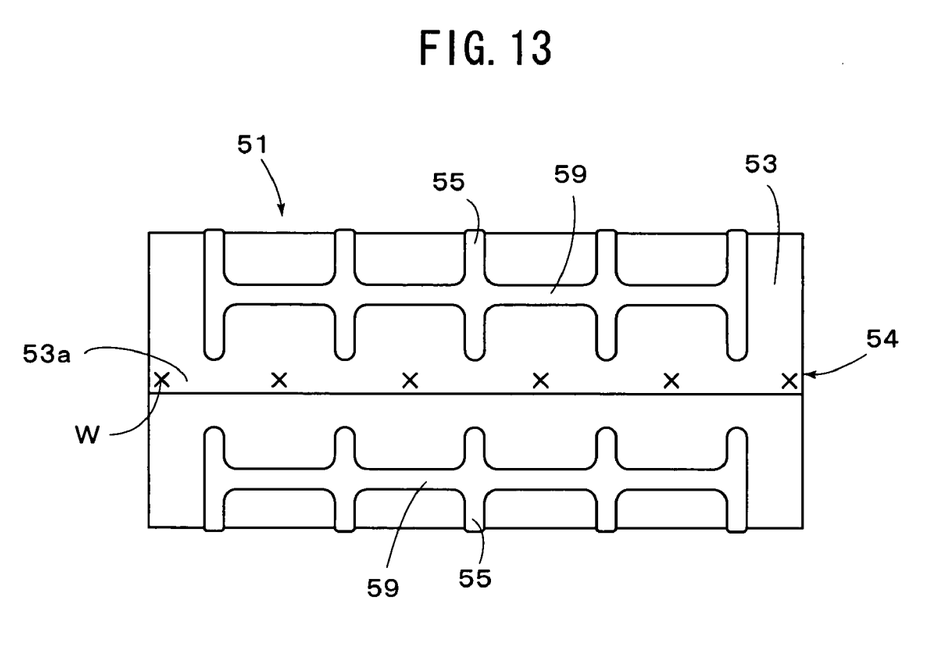
FIG. 13 is a plan view showing an outer tube according to a further embodiment of the present invention.

Furthermore, as shown in FIG. 13, line grooves 59 (cross ribs) may be provided, so as to cross a plurality of line grooves 55, which extend in the circumferential direction. Consequently, the steam between an inner plate (not shown in FIG. 13) and an outer plate 53 is received in the line grooves 55 and 59, so that a large quantity of steam will be easily disposed. Also, as an auxiliary effect, membrane rigidity of surface of the outer tube 51 is improved by the line grooves 59, so that the noise emitted from the muffler can be decreased.

The invention claimed is:

1. In an outer tube of an exhaust system part, with a sheet metal being rolled double to form a cylinder having an inner plate and an outer plate, and form an overlapped portion with circumferential end portions of said inner plate and outer plate crossed in the circumferential direction, and being joined at the overlapped portion, the outer tube of the exhaust system part characterized in that a plurality of circumferential communication passages are formed between said inner plate and said outer plate, with tip end portions of the respective circumferential communication passages facing with each other to be apart from each other by a predetermined distance from a peripheral edge of one of said inner plate and said outer plate, and are arranged in parallel with each other along a longitudinal direction of said outer plate, and that at least one portion of said overlapped portion positioned between neighboring circumferential communication passages out of said plurality of circumferential communication passages is joined.

2. An outer tube of an exhaust system part as set forth in claim 1, wherein radial cross sections of said inner plate and outer plate are formed in a non-circular shape, respectively, and wherein said circumferential communication passages are formed at positions of said inner plate and outer plate having a minimal radius of curvature thereof, respectively.

3. An outer tube of an exhaust system part as set forth in claim 1, wherein said circumferential communication passages comprise a plurality of line grooves formed by bulging said outer plate out.

4. An outer tube of an exhaust system part as set forth in claim 1, wherein the one portion of said overlapped portion positioned between the neighboring circumferential communication passages out of said plurality of circumferential communication passages is welded.

5. In an outer tube of an exhaust system part, with a sheet metal being rolled double to form a cylinder having an inner plate and an outer plate, and with circumferential end portions of said inner plate and outer plate being joined by a lock-seaming process, the outer tube of the exhaust system part characterized in that a plurality of circumferential communication passages are formed between said inner plate and said outer plate, with tip end portions of the respective circumferential communication passages facing with each other to be apart from each other by a predetermined distance from a peripheral edge of one of said inner plate and said outer plate, and are arranged in parallel with each other along a longitudinal direction of said outer plate.

6. An outer tube of an exhaust system part as set forth in claim 5, wherein radial cross sections of said inner plate and outer plate are formed in a non-circular shape, respectively, and wherein said circumferential communication passages are formed at positions of said inner plate and outer plate having a minimal radius of curvature thereof, respectively.

7. An outer tube of an exhaust system part as set forth in claim 5, wherein said circumferential communication passages comprise a plurality of line grooves formed by bulging said outer plate out.

* * * * *